E. CHILDREN.
Wheel-Cultivator.
No. 58,380
Patented Oct. 2, 1866.
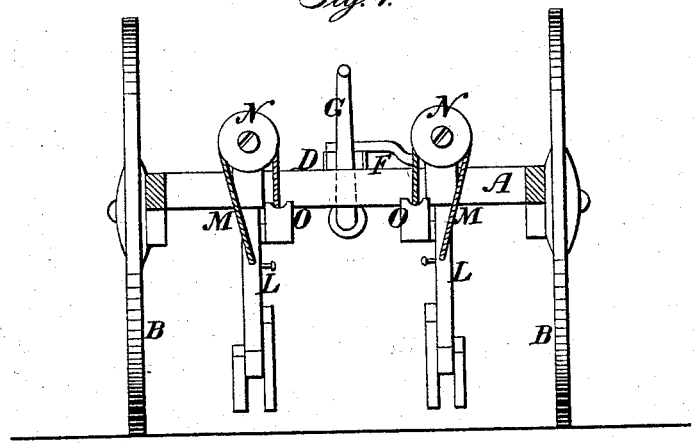
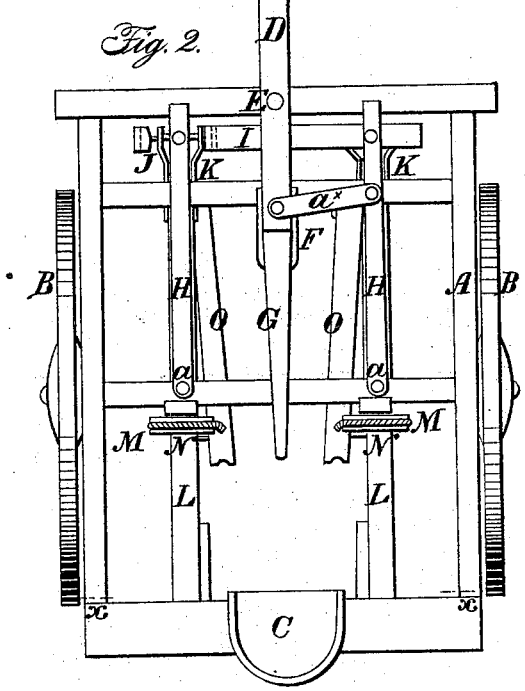
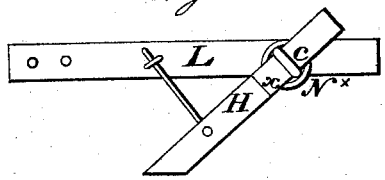
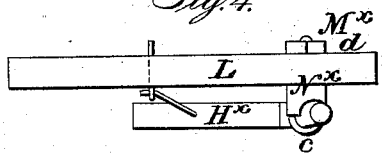
Witnesses:
J. W. Bloington
Wm. Trewin
Inventor:
E. Children
Per Munn & Co
Attorneys

UNITED STATES PATENT OFFICE.

EDWIN CHILDREN, OF LANCASTER, WISCONSIN.

IMPROVEMENT IN CULTIVATORS.

Specification forming part of Letters Patent No. 58,380, dated October 2, 1866.

*To all whom it may concern:*

Be it known that I, EDWIN CHILDREN, of Lancaster, Grant county, State of Wisconsin, have invented a new and Improved Cultivator; and I do hereby declare that the following is a full, clear, and exact description thereof, which will enable others skilled in the art to make and use the same, reference being had to the accompanying drawings, forming part of this specification, in which—

Figure 1 is a transverse vertical section of my invention, taken in the line $x\,x$, Fig. 2; Fig. 2, a plan or top view of the same; Figs. 3 and 4, detached views of a portion of the same.

Similar letters of reference indicate like parts.

This invention relates to a new and improved cultivator of that class in which laterally-adjustable plows are employed; and it consists in a novel arrangement of the plow-beams and the draft-pole, whereby the plows may be moved or adjusted laterally with the greatest facility.

The invention also consists in a novel manner of attaching the plow-standards to the beams, whereby the plows may be adjusted more or less obliquely, to throw the earth either toward or from the plants, as may be desired, or adjusted in a plane at right angles with the machine, to cant the earth at both sides of the furrow when required.

A represents a rectangular frame, which is mounted on two wheels, B B, having the driver's seat C on its rear end, and a draft-pole, D, secured to its front end by a pivot-polt, E. The rear end of the draft-pole is connected by a strap, F, with a lever, G, which extends back within the reach of the driver on his seat C.

On the frame A there are secured by pivots $a\,a$ two parallel bars, H, the pivots passing through the rear ends of the bars; and to the front ends of the bars H H there is attached, by pivots $b$, a bar, I, which is parallel with the front end of the frame A, and has its ends bent down to form bearings for a shaft, J, on which clevises K are fitted loosely, said clevises being attached to the front ends of beams L L, each of which has a cord, M, attached to it; and these cords pass over pulleys N N on the frame A, and are secured to the outer ends of treadles O, attached to the beams.

The rear end of the draft-pole is connected by a link, $a^\times$, with one of the bars H.

From the above description it will be seen that the beams may be raised by actuating the treadles O, and consequently the plows, which are attached to the beams, may be raised out of the ground whenever required, and by operating the lever G the plows may be moved laterally, and the frame of the machine at the same time canted or turned, so as to favor the quick movement of the plows either to the right or left. By this means the plows may be made to conform to the sinuosities of the rows of plants, so that the latter will not be in danger of being plowed out of the earth.

The plows are secured to standards $H^\times$, which are attached to the beams L L, as follows: Through each beam L a screw, $M^\times$, passes transversely, said screws having an eye, $c$, at one end and a nut, $d$, on the opposite end, the eyes $c$ being of sufficient dimensions to admit of the standards $H^\times$ passing through them. To the inner sides of the beam L L there are secured sockets $N^\times$, through which the screws $M^\times$ pass. These sockets are of concave form, to receive a portion of the eyes $c$ and standards $H^\times$, and admit of the latter being thoroughly clamped by screwing up the nuts $d$. By this simple arrangement the plows may be adjusted obliquely, so as to throw the earth either to the right or left, or adjusted in a plane parallel with the front end of the frame A.

Having thus described my invention, I claim as new and desire to secure by Letters Patent—

The pivoted draft-pole D, in combination with the pivoted bars H H, lever G, and the plow-beams L L, connected to the bar I, which is pivoted to the bars H H, all arranged substantially as and for the purpose set forth.

The above specification of my invention signed by me this 28th day of February, 1866.

EDWIN CHILDREN.

Witnesses:
 ADDISON BURR,
 F. A. BURR.